United States Patent
Haun

(10) Patent No.: US 9,750,183 B2
(45) Date of Patent: Sep. 5, 2017

(54) QUICK ATTACH ROTARY MOWER BLADE SYSTEM

(71) Applicant: Deere & Company, Moline, IL (US)

(72) Inventor: Robert D. Haun, Fuquay Varina, NC (US)

(73) Assignee: DEERE & COMPANY, Moline, IL (US)

(*) Notice: Subject to any disclaimer, the term of this patent is extended or adjusted under 35 U.S.C. 154(b) by 0 days.

(21) Appl. No.: 14/805,310

(22) Filed: Jul. 21, 2015

(65) Prior Publication Data
US 2017/0020067 A1    Jan. 26, 2017

(51) Int. Cl.
*A01D 34/52* (2006.01)
*A01D 34/73* (2006.01)
*A01D 101/00* (2006.01)

(52) U.S. Cl.
CPC ........ *A01D 34/733* (2013.01); *A01D 2101/00* (2013.01)

(58) Field of Classification Search
CPC .. A01D 2101/00; A01D 34/63; A01D 34/661; A01D 34/73; A01D 34/733
USPC ............................ 56/17.5, 255, 295, DIG. 20
See application file for complete search history.

(56) References Cited

U.S. PATENT DOCUMENTS

| | | | | |
|---|---|---|---|---|
| 2,875,569 A | * | 3/1959 | Sauer | A01D 34/733 |
| | | | | 56/295 |
| 2,889,677 A | * | 6/1959 | Wood | A01D 34/736 |
| | | | | 56/295 |
| 3,877,146 A | * | 4/1975 | Pittinger | A01D 34/73 |
| | | | | 30/264 |
| 4,213,289 A | * | 7/1980 | Kamppinen | A01D 34/003 |
| | | | | 56/13.4 |
| 4,479,302 A | * | 10/1984 | Richter | A01D 34/84 |
| | | | | 172/14 |
| 4,525,990 A | | 7/1985 | Zweegers | |
| 4,586,257 A | | 5/1986 | Rittenhouse | |
| 4,712,364 A | | 12/1987 | Oxley | |
| 4,730,952 A | * | 3/1988 | Wiley | B24B 45/006 |
| | | | | 30/388 |
| 4,771,593 A | * | 9/1988 | Lee | A01D 34/733 |
| | | | | 464/33 |
| 4,936,884 A | * | 6/1990 | Campbell | A01D 34/4168 |
| | | | | 30/276 |
| 5,163,276 A | | 11/1992 | Mohrman | |
| 5,622,035 A | | 4/1997 | Kondo et al. | |
| 5,782,073 A | | 7/1998 | Sheldon | |

(Continued)

FOREIGN PATENT DOCUMENTS

EP   2430898 A1   3/2012
WO   2013/049324 A1   4/2013

OTHER PUBLICATIONS

British Search Report in foreign counterpart application GB1611945.5, dated Jan. 6, 2017 (3 pages).

*Primary Examiner* — Thomas B Will
*Assistant Examiner* — Joan D Misa

(57) ABSTRACT

A quick attach rotary mower blade system includes a blade holder secured to a mower spindle with a shoulder bolt, a pair of upwardly extending protrusions on the blade holder, and a spring biased plunger extending downwardly from the blade holder. A rotary mower blade has a center hole that slides over the shoulder bolt, compresses the spring biased plunger, and rotates over the protrusions to an engaged position.

10 Claims, 3 Drawing Sheets

(56) References Cited

U.S. PATENT DOCUMENTS

| | | | |
|---|---|---|---|
| 5,960,617 A | 10/1999 | Sheldon | |
| 6,205,755 B1 | 3/2001 | Bontrager et al. | |
| 6,367,235 B1 | 4/2002 | Moynihan | |
| 6,470,661 B1 * | 10/2002 | Plamper | A01D 34/733 56/17.5 |
| 6,681,865 B2 | 1/2004 | Pace | |
| 6,688,095 B2 | 2/2004 | Wadzinski | |
| 6,925,718 B2 * | 8/2005 | Bartmann | B24B 23/02 30/276 |
| 6,935,095 B1 | 8/2005 | Sluder | |
| 7,127,877 B2 * | 10/2006 | Curran | A01D 34/73 56/255 |
| 7,506,494 B2 | 3/2009 | Eavenson, Sr. et al. | |
| 7,703,267 B2 | 4/2010 | Tapper | |
| 7,775,026 B2 | 8/2010 | Bever | |
| 7,784,254 B2 | 8/2010 | Bever | |
| 7,958,710 B2 | 6/2011 | Gilpatrick et al. | |
| 8,869,369 B1 | 10/2014 | Roach | |
| 8,931,248 B2 | 1/2015 | Eavenson, Sr. et al. | |
| 8,935,909 B2 | 1/2015 | Eavenson, Sr. et al. | |
| 9,271,442 B2 * | 3/2016 | Pellenc | A01D 34/733 |
| 9,560,800 B2 * | 2/2017 | Reichen | A01D 34/64 |
| 2009/0308045 A1 | 12/2009 | Bever | |
| 2010/0326034 A1 | 12/2010 | Gilpatrick et al. | |
| 2012/0110970 A1 | 5/2012 | Blarek | |
| 2013/0199148 A1 | 8/2013 | Goudeau, Jr. | |
| 2013/0269192 A1 | 10/2013 | Pellenc | |
| 2013/0327007 A1 | 12/2013 | Eavenson, Sr. et al. | |
| 2015/0289447 A1 * | 10/2015 | Reichen | A01D 34/733 56/295 |
| 2016/0242355 A1 | 8/2016 | Talaski | |

* cited by examiner

QUICK ATTACH ROTARY MOWER BLADE SYSTEM

FIELD OF THE INVENTION

This invention relates to rotary mower blades on grass mowing machines, and specifically to the removal and installment of rotary mower blades to a mower deck spindle.

BACKGROUND OF THE INVENTION

One issue that may dissatisfy users and customers of grass mowing machines is the amount of time and difficulty needed to remove and install rotary mower blades for sharpening or replacement. The blades normally are installed with a center attachment bolt and washer assembly that threads into a mower deck spindle assembly. The bolt then needs to be torqued to secure the blade to the spindle assembly. Depending on the size of the mower deck and the number of spindle assemblies, center attachment bolts may be difficult to reach and attach a wrench or socket to each bolt and tighten it sufficiently. Additionally, due to limited ground clearance and accessibility to the underside of the mower deck, there may be limited space to provide adequate leverage to the wrench or socket to break the bolt loose. The amount of torque required to break a bolt loose can be substantial if the blade has not been changed for a long time. This may require an additional lever or wood block to lock the blade into position for proper torqueing of the bolt.

Some users and customers of grass mowing machines may need to change rotary mower blades frequently because of heavy usage, such as mowing every day. Others may need to change rotary mower blades when the grass mowing machines are used at a distance from the blade changing tools. Additionally, users and customers may need to change rotary mower blades each time a different blade type is required. Each blade type may have a different depth, thicknesses, or edge shape to meet requirements of cut quality, lift, mulching, etc.

A quick attach rotary mower blade system is needed that allows removal and installment of a blade without a wrench or socket. A quick attach rotary mower blade system is needed that is easy to use. A quick attach rotary mower blade system is needed that does not require application of high torque to a center attachment bolt under the mower deck. A quick attach rotary mower blade system is needed that may secure blades having different depths, thicknesses, and edge shapes. A quick attach rotary mower blade system is needed that requires little or no modification of existing rotary spindles and/or mower blades.

SUMMARY OF THE INVENTION

A quick attach rotary mower blade system includes a blade holder having a pair of L-shaped arms that hold a mower blade. A plunger extends downwardly from the blade holder, and has a face that is spring biased to press against the mower blade and hold the mower blade in engagement with the pair of L-shaped arms. A shoulder bolt secures the blade holder to a spindle and has an unthreaded shoulder with a smaller diameter than a central opening in the plunger and a central opening in a mower blade. The plunger may slide along the unthreaded shoulder and the mower blade may be removed and installed while the blade holder, spring loaded plunger and shoulder bolt remain attached to the spindle.

The quick attach rotary mower blade system allows removal and installment of a blade without a wrench or socket. The system is easy to use and does not require application of high torque to a center attachment bolt under the mower deck. The quick attach rotary mower blade system may secure blades having different depths, thicknesses, and edge shapes, and requires little or no modification of existing rotary spindles and/or mower blades.

DESCRIPTION OF THE PREFERRED EMBODIMENT

Figure 1:
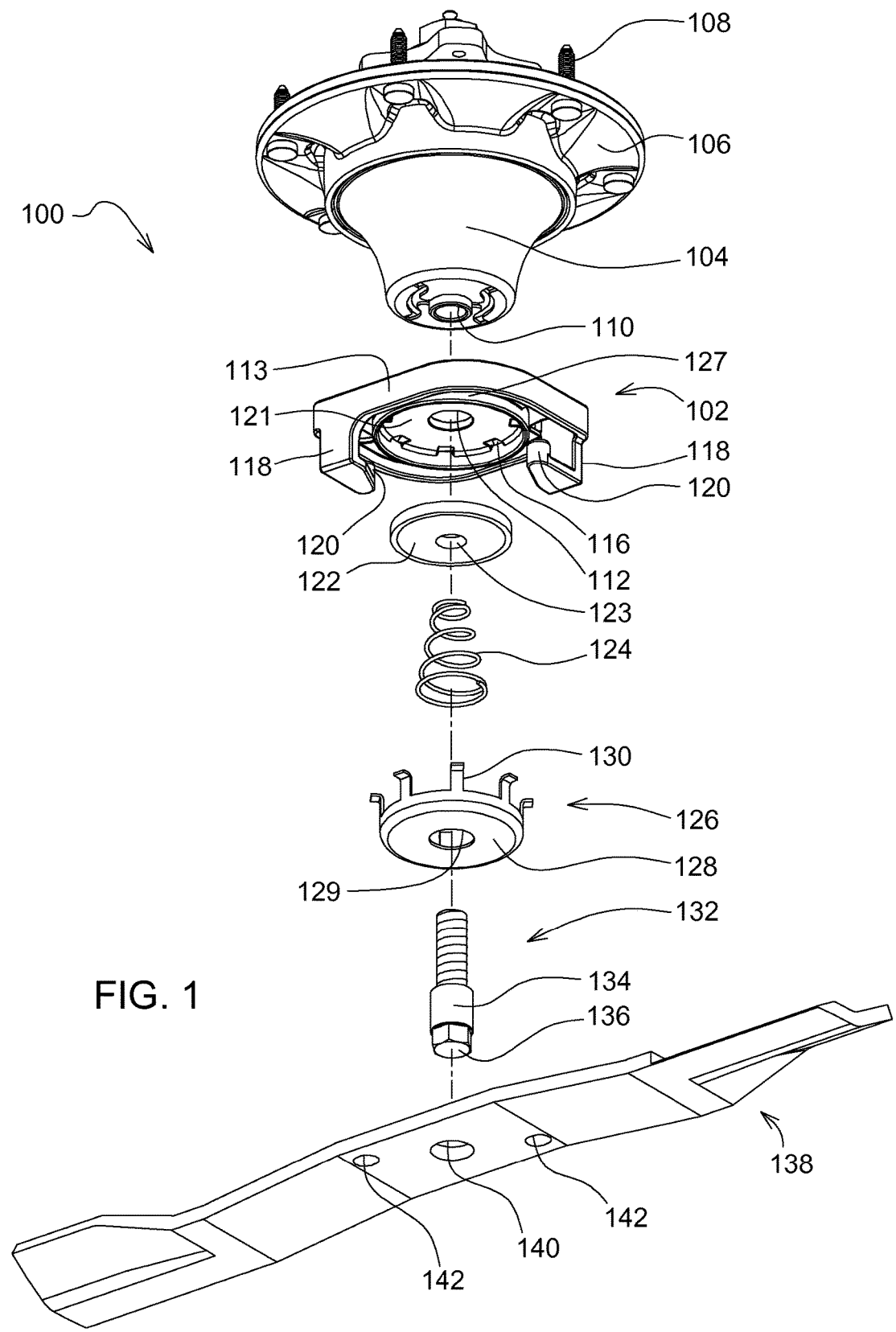
FIG. 1 is an exploded perspective view of a quick attach rotary mower blade system according to a first embodiment of the invention.
Figure 2:
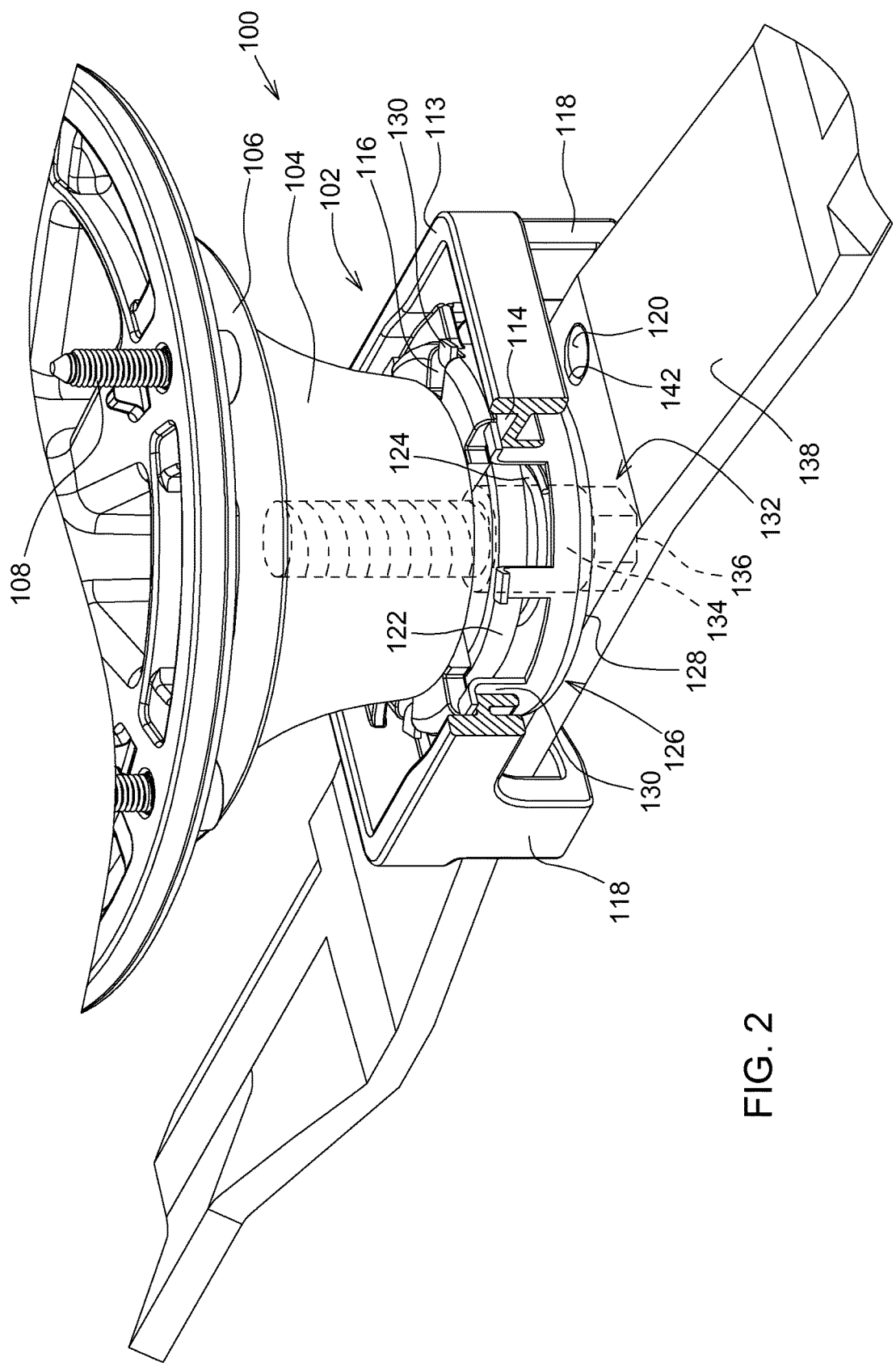
FIG. 2 is a perspective view, partially in section, of a quick attach rotary mower blade system after the blade is installed according to a first embodiment of the invention.
Figure 3:
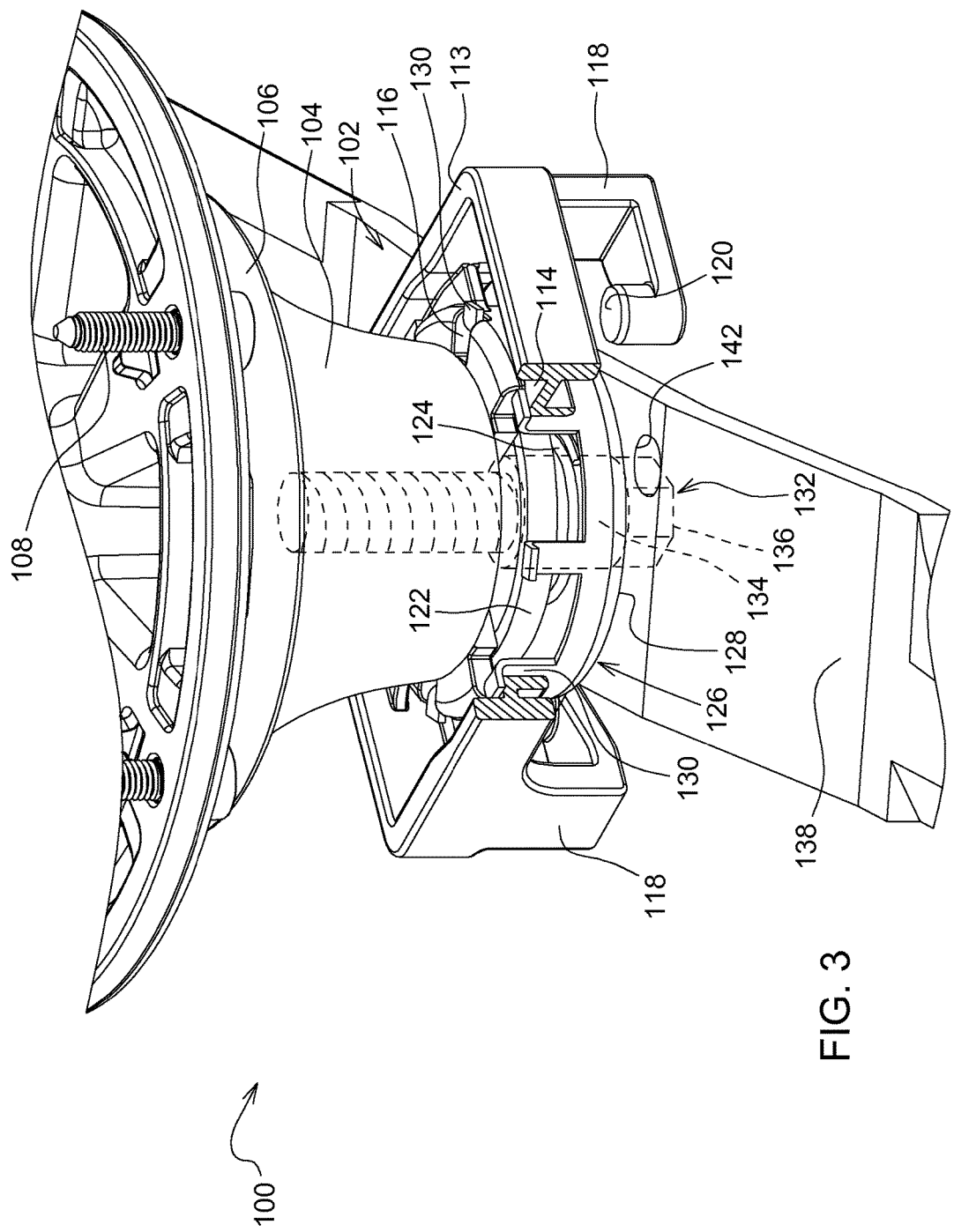
FIG. 3 is a perspective view, partially in section, of a quick attach rotary mower blade system before the blade is installed according to a first embodiment of the invention.

FIGS. 1-3 show one embodiment of quick attach rotary mower blade system 100 for use with one more rotary mower blades under a mower deck. The quick attach rotary mower blade system may be used to manually remove and install mower blade 138 to mower spindle 104 without tools. All of the components of the quick attach rotary mower blade system, including blade holder 102, coil spring 124, plunger 126, and shoulder bolt 132, remain attached to the spindle when the mower blade is removed.

In one embodiment, the quick attach mower blade system may include blade holder 102 which may be a one-piece steel or hard plastic molded structure that may be secured to spindle 104. Spindle 104 may be rotatably mounted to flange 106 which may be attached with threaded fasteners 108 to the underside of a mower deck. The blade holder may have outer frame 113 and a pair of L-shaped arms 118 that extend downwardly from opposing sides of the outer frame to hold a mower blade. Each L-shaped arm may include a generally vertical part extending down from the frame, and a generally horizontal part that is under the mower blade when the mower blade is installed. The horizontal part may be spaced apart from the outer frame sufficiently so that mower blade 138 may fit between the horizontal part and the outer frame. The blade holder also may have a central opening 112 that is coaxial with the internally threaded central opening 110 of spindle 104, and a rim 127 where washer 122 may be positioned.

In one embodiment, the quick attach rotary mower blade system may include a spring loaded plunger 126. Coil spring 124 may provide a downward spring force axially against plunger 126. As a result, the face 128 of the plunger may press down against mower blade 138. The coil spring may be positioned between washer 122 and/or blade holder 102, and plunger 126. The coil spring may have a conical shape to minimize the spring's thickness in its compressed state. Plunger 126 may be a sheet metal component having a downward face 128 and a drum shape. The plunger also may have a plurality of retaining fingers 130 that extend upwardly from the plunger's outer circumference. Each retaining finger may extend through a notch 116 in blade holder 102. Each retaining finger may contact a stop 114 at the base of each notch to limit how far the plunger may extend from the blade holder, and retain the plunger to the blade holder. Notches 116, stops 114, and rim 127 may be provided on shelf 121 between central opening 112 and outer frame 113 of the blade holder.

In one embodiment, the quick attach mower blade system may include shoulder bolt 132. The shoulder bolt may be threaded to the internally threaded opening 110 of spindle 104, and remains secured to the spindle whenever the mower blade is removed. The shoulder bolt may be threaded to the spindle by turning the shoulder bolt's head 136. Adjacent the head, the shoulder bolt may have an unthreaded shoulder 134 having a slightly larger diameter than head 136, and an axial length of about ½ inch to about 1 inch. The unthreaded shoulder 134 also may have a larger diameter than opening 123 in washer 122, so the shoulder bolt and washer may be used to secure the blade holder on the spindle. However, the unthreaded shoulder 134 may have a smaller diameter than central opening 129 in plunger 126, so the plunger may slide up and down the shoulder bolt during installation of the mower blade. The unthreaded shoulder also may have a slightly smaller diameter than central opening 140 in the mower blade, so the mower blade may be installed or removed by sliding over the shoulder bolt, without removing the shoulder bolt.

In one embodiment, the quick attach mower blade system may include a pair of upwardly facing protrusions 120 on the blade holder. The protrusions may engage a pair of holes 142 in the mower blade. Adding holes to the mower blade requires a modification to conventional mower blades, but is relatively easy and inexpensive. One of the upwardly facing protrusions may be provided on the horizontal part of each L-shaped arm. The pair of protrusions 120 may be located asymmetrically on the L-shaped arms, or may have different shapes or sizes. Similarly, the pair of holes 142 may be located asymmetrically on the mower blade, or may have different shapes or sizes. As a result, the mower blade may be installed in only one position and not upside down.

In one embodiment, an operator may install mower blade 138 onto the quick attach mower blade system easily and without tools. First, as shown in FIG. 3, the operator may manually position the mower blade in the gap between the pair of L-shaped arms 118. The operator then may push the mower blade up against plunger 126 to compress coil spring 124. The operator may push the mower blade up high enough for the bottom of the blade to clear protrusions 120, and then may pivot the mower blade on its central axis 140 over the protrusions onto the L-shaped arms. The operator may pivot the mower blade until the mower blade contacts the vertical part of each L-shaped arm. At this point, the pair of holes 142 in the mower blade should be positioned over the pair of upwardly extending protrusions 120. When the operator stops pushing the mower blade up, the plunger may urge the mower blade down toward the horizontal part of the L-shaped arms, pushing the pair of holes 142 over the pair of protrusions 120. After installation, as shown in FIG. 2, the coil spring may continue to apply spring force against the plunger, holding the mower blade in place and holding protrusions 120 inside holes 142.

In one embodiment, an operator also may remove mower blade 138 from the quick attach mower blade system easily and without tools. First, the operator may push the mower blade up against plunger 126 to compress coil spring 124, until protrusions 120 are out of holes 142. While continuing to push the mower blade up, the operator may pivot the mower blade over the protrusions and toward the gap between the pair of L-shaped arms 118. The operator may stop pushing the mower blade up when the mower blade reaches the gap.

Having described the preferred embodiment, it will become apparent that various modifications can be made without departing from the scope of the invention as defined in the accompanying claims.

The invention claimed is:

1. A quick attach rotary mower blade system, comprising:
   a blade holder having a pair of L-shaped arms extending under a mower blade; each L-shaped arm having a protrusion extending upwardly from the L-shaped arm under the mower blade into a hole in the mower blade;
   a plunger extending downwardly from the blade holder; the plunger having a face that is spring biased to press against the mower blade and hold the mower blade in engagement with the pair of L-shaped arms; and
   a shoulder bolt securing the blade holder to a spindle and having an unthreaded shoulder with a smaller diameter than a central opening in the plunger and a central opening in the mower blade, the plunger may slide along the unthreaded shoulder and the mower blade may be removed and installed while the blade holder, the plunger and the shoulder bolt remain attached to the spindle.

2. The quick attach rotary mower blade system of claim 1 wherein the blade holder has an outer frame and the L-shaped arms extend downwardly from the outer frame.

3. The quick attach rotary mower blade system of claim 1 wherein the plunger is retained to the blade holder, limiting the travel of the plunger relative to the blade holder.

4. The quick attach rotary mower blade system of claim 1 wherein the pair of protrusions and the pair of holes are asymmetric.

5. A quick attach rotary mower blade system, comprising:
   a blade holder secured to a mower spindle with a shoulder bolt;
   a pair of upwardly extending protrusions on the blade holder;
   a spring biased plunger extending downwardly from the blade holder; and
   a mower blade having a center hole that slides over the shoulder bolt, the blade compressing the spring biased plunger, and rotating over the protrusions to an engaged position whereby the blade holder supports the mower blade and each protrusion is engaged to an underside of the mower blade; and
   a pair of holes in the mower blade that engage the protrusions.

6. A quick attach rotary mower blade system, comprising:
   a blade holder secured to a mower spindle with a shoulder bolt;
   a pair of upwardly extending protrusions on the blade holder;
   a spring biased plunger extending downwardly from the blade holder; and
   a mower blade having a center hole that slides over the shoulder bolt, the blade compressing the spring biased plunger, and rotating over the protrusions to an engaged position whereby the blade holder supports the mower blade and each protrusion is engaged to an underside of the mower blade;
   wherein the protrusions are on a pair of L-shaped arms extending downwardly from the blade holder.

7. A quick attach rotary mower blade system, comprising:
   a blade holder secured to a mower spindle with a shoulder bolt;
   a pair of upwardly extending protrusions on the blade holder;

a spring biased plunger extending downwardly from the blade holder; and a mower blade having a center hole that slides over the shoulder bolt, the blade compressing the spring biased plunger, and rotating over the protrusions to an engaged position whereby the blade holder supports the mower blade and each protrusion is engaged to an underside of the mower blade; and retaining fingers that retain the spring biased plunger to the blade holder.

8. A quick attach rotary mower blade system, comprising:

a blade holder having a pair of L-shaped arms, each having an upwardly extending protrusion;

a shoulder bolt securing the blade holder to a spindle; the shoulder bolt having an unthreaded shoulder with a smaller diameter than a central hole of a mower blade; and a spring biased plunger having a face that presses downwardly against the mower blade and urges the mower blade into engagement with the blade holder whereby the protrusions enter the mower blade from an underside of the mower blade; the spring biased plunger retained to the blade holder with a plurality of retaining fingers.

9. The quick attach rotary mower blade system of claim 8 wherein the mower blade has a pair of holes matching the pair of protrusions.

10. The quick attach rotary mower blade system of claim 8 wherein the spring biased plunger slides along the unthreaded shoulder of the shoulder bolt.

\* \* \* \* \*